April 7, 1959  R. J. LIPINSKI  2,881,106
SURFACE BONDED TITANIUM PRODUCT, COMPOSITE STRUCTURE
THEREOF AND METHOD OF BONDING A TITANIUM SURFACE
Filed March 7, 1957

INVENTOR:
RICHARD J. LIPINSKI
BY Howson & Howson
ATTYS.

United States Patent Office 2,881,106
Patented Apr. 7, 1959

2,881,106

SURFACE BONDED TITANIUM PRODUCT, COMPOSITE STRUCTURE THEREOF AND METHOD OF BONDING A TITANIUM SURFACE

Richard J. Lipinski, Erie, Pa., assignor to Lord Manufacturing Company, Erie, Pa., a corporation of Pennsylvania Application March 7, 1957, Serial No. 644,489

8 Claims. (Cl. 148—6.24)

The present invention relates to a novel method of improving the bondability of titanium surfaces toward organic polymeric materials and to the resulting treated product; and, more particularly, the invention relates to a novel method whereby the adhesion of polymeric organic materials to surfaces of titanium is enhanced through chemical treatment of the metal surface, and to the improved bonded assembly. The invention also relates to novel compositions for treating surfaces of titanium for improving the bondability thereof toward organic polymeric materials, and to novel products comprising the treated titanium. The present application is a continuation-in-part of application Serial No. 563,901, filed February 7, 1956.

The problem of bonding organic polymeric materials to surfaces of titanium is becoming of increasing importance. The problem is presently most prevalent in two main fields: (1) the coating of such metal surfaces with organic polymeric compositions, such as paints and other films, for protective and/or decorative purposes; and (2) the application of an organic polymeric adhesive composition to the titanium surface in a bonding operation whereby another material, which may be organic or inorganic, is bonded to the metal surface through the agency of the stated adhesive.

It is generally known that the bonds obtained between organic polymeric materials and titanium are not as great as is desired in most instances. Although the actual magnitude of bond strength depends upon the particular material bonded to the titanium, with any combination means have been sought by which the adhesion may be increased. It is to the marked increase of adhesion between organic polymeric materials generally to titanium that the present invention is directed.

It is the principal object of the present invention to provide a method of increasing the bondability of titanium toward organic polymeric materials.

It is another object of the present invention to provide a method of bonding organic polymeric materials to surfaces of titanium by which improved adhesion between the two stated components is obtained.

It is another object of the present invention to provide a relatively simple and economic method of treating surfaces of titanium to markedly enhance the bondability of the treated surface to applied organic polymeric materials.

A further object of the invention is to provide novel assemblies comprising a surface of titanium bonded to organic polymeric materials in which the adhesion between the titanium and the organic polymeric material is greater than in prior assemblies.

Other objects, including the provision of a novel treated surface of titanium to which organic polymeric materials can be bonded with increased adhesion, and the provision of novel compositions for treating surfaces of titanium, will become apparent from the following specification and the claims.

It has been found that the treatment of a titanium surface with an acid solution of sulfamic acid containing fluoride ions in a certain concentration more fully discussed hereinafter, the solution having a pH below 3, alters the titanium surface, involving etching and the formation of a film thereon, in such a way that organic polymeric materials applied to the altered surface adhere thereto with a tenacity substantially greater than is the case with untreated titanium surfaces. This is unexpected inasmuch as other acids, like sulfuric acid, hydrochloric acid, nitric acid, and the like, either alone or in combination with fluoride ions, do not provide the same results, and in some cases treatment with such acids is detrimental, producing poorer results, as far as bondability is concerned, than untreated titanium surfaces.

The method of the present invention, therefore, comprises wetting the titanium surface with the above-mentioned acid solution until the titanium surface is visibly altered through etching and the formation of a film thereon and recovering the titanium with the film on the surface thereof. The resulting product comprises the titanium surface having thereon a film constituting a reaction product between the titanium in the titanium-surface and the sulfamic acid. There may then be applied to the so treated titanium surface the desired organic polymeric material. The resulting product comprises the titanium surface and the organic polymeric material bonded to each other through the agency of a film formed on the titanium and constituting a reaction product between the titanium of the titanium surface and the sulfamic acid.

The present invention will be more readily understood from a consideration of the drawings in which.

Figure 1:
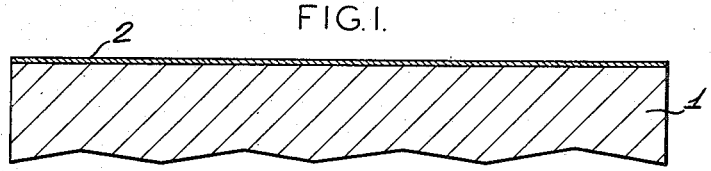
Figure 1 is a side view in section showing a piece of titanium having the film thereon.

The treatment of the present invention has been found to result in vastly improved bonds between titanium surfaces and organic polymeric materials applied thereto. This means that protective and decorative coatings comprising organic polymeric materials which are applied to such treated titanium surfaces adhere thereto more tenaciously than the same coatings applied to similar but untreated titanium surfaces. Likewise, adhesives comprising polymeric organic material applied to the treated titanium surfaces bond more tenaciously to the treated surface so that other structural elements bonded to the titanium through the agency of the applied adhesive are more tenaciously bonded thereto than is the case with similar assemblies produced, howecer, without the treatment of the invention.

The magnitude of the increase in adhesion obtained through the present invention may range from several percent to several fold, the latter in the case of organic polymeric materials which normally have little or no significant bonding affinity for titanium. The reason for the increased adhesion obtained by the present invention is not presently fully understood. It is known, however, that the sulfamic acid-fluoride ion solution initially removes oxide on the titanium surface and etches slightly into the surface. More important, however, is the formation of a film which can be visually observed. This film is believed to result from some retention, on the metal surface, of the product of the reaction between the sulfamic acid and the titanium, the titanium replacing the hydrogen ion of the acid and the residue of the sulfamic acid bonding chemically to the titanium of the titanium surface. The titanium atom to which the residue of the sulfamic acid is chemically bonded is itself part of the main mass of metal and is bonded thereto by means of the forces governing its initial incorporation in the surface lattice. The film is thus firmly attached chemically to the metal surface. The film also appears to be more readily wetted by organic materials applied thereto than is the untreated titanium surface or titanium surfaces treated with other acids either alone or in combination with a fluoride. At any rate, organic materials applied to the film adhere thereto, and hence to the metal body, with much greater tenacity than to untreated titanium.

The treatment, as stated, is applicable to titanium, either in pure or commerically pure form or in the form of alloys in which titanium is the major constituent. Examples of alloys which may be treated are: 7–8% manganese, balance titanium; 3–4% manganese and 1–4% aluminum, balance titanium; 1.5–2.5% iron, 1.5–2.5% chromium and 1.2–2.5% molybdenum, balance titanium; 1.25% iron, 5% aluminum and 2.75% chromium, balance titanium; and the like.

In treating the titanium surface in accordance with the present invention, an acid solution of the sulfamic acid and fluoride may be applied to the titanium surface as by brushing, spraying, dipping, or the like. Water represents the preferred solvent medium for use in treating the titanium; however, other liquids may be used in place of or in conjunction with water, such as alcohols, like methanol and ethanol; glycols; glycerol; glycol ethers; and the like.

The concentration of the sulfamic acid in the treating solution has been found to be relatively immaterial. In this connection, it has been found that the sulfamic acid, even at very low concentrations, selectively reacts with the titanium surface. Thus, concentrations of sulfamic acid in the treating solution as low as about 1%, by weight, are satisfactory. The maximum concentration of the sulfamic acid in the treating medium is limited only by its solubility in the particular solvent medium selected. In many cases, the concentration of sulfamic acid may go up to as high as 30–40%, by weight, although no advantage is to be gained by employing concentrations substantially in excess of about 20%, by weight.

The amount of fluoride ions in the bath should be at least 0.1%, by weight, based on the weight of the sulfamic acid in order to provide significant improvement. In amounts above about 10%, by weight, on the same basis, however, the fluoride ions interfere with the film-forming action of the sulfamic acid. Hence, the synergistic effect provided by the fluoride ions with the sulfamic acid lies within this fluoride ion concentration range. Preferably, the amount of fluoride ions does not exceed about 5%, on the above basis.

As stated, the pH of the treating medium will be below about 3. In this connection, for general purposes, the lower the pH, that is to say the higher the acidity, the more rapid is the action of the bath on the titanium. In some cases the pH may go as low as about .1. In preferred practice wherein the pH conditions are provided substantially by the sulfamic acid, the pH will not be below about 1.

In most cases the sulfamic acid itself will provide the desired pH even when the fluoride ions in the solution are provided by adding a fluoride salt. However, in the event that it does not, another, strong acid, like nitric acid, may be added to the bath.

The bath, as stated, will contain fluoride ions, such as by adding hydrofluoric acid or a fluoride or acid fluoride. As far as is presently known any compound capable of liberating fluoride ions in acid solution may be employed. Examples of suitable fluorides are the alkali metal fluorides, like sodium fluoride, potassium fluoride, sodium bifluoride, and the like; ammonium fluoride; the alkaline earth metal fluorides, like calcium fluoride, and the like; nickel fluoride; chromium fluoride; and the like. Because of the corrosive nature of acid fluoride solutions it is not always feasible to transport and to store treating solutions comprising the sulfamic acid and the fluoride. In such case it is preferred to prepare a dry mixture of the dry, solid, finely-divided sulfamic acid and a dry, solid, finely-divided fluoride soluble in acid solution in which the proportion of sulfamic acid to fluoride is sufficient to provide, upon dissolution of the mixture, fluoride ions in a desired concentration within the range set forth above and at least about 1%, by weight, of sulfamic acid as such. An example of such a composition is a mixture of sulfamic acid and sodium bifluoride in a weight ratio between about 5 to 1 and about 100 to 1. In this connection a particularly advantageous stable commercial composition adapted for dissolution in water to provide a treating solution is a mixture of about 15 parts, by weight, of sulfamic acid to about 1 part of sodium bifluoride.

It will be apparent that the sulfamic acid in solution may be provided by dissolving a salt of the sulfamic acid in a solution sufficiently acid to provide the sulfamic acid and a pH as defined above. In accordance with the preferred practice of the present invention, however, the pH conditions are provided substantially entirely by the sulfamic acid itself. In other words, the amount of sulfamic acid in the treating solution will be such as to provide the desired pH, little or not reliance being placed upon an additional acid to provide the requisite acidity.

The temperature of the solution during the treatment may vary somewhat, depending upon the other conditions, principally pH, and in general the higher the temperature the greater the rate of reaction. Thus temperature can be correlated with other conditions, principally pH of the solution, to provide any desired rate of reaction. It may be desirable to employ elevated temperatures, that is above about 100° F., in order to obtain a satisfactory rate of reaction. Broadly speaking, however, the temperature of the treating solution may range from room temperature up to the boiling point, although in most cases the temperature need not exceed about 180° F.

As stated, treatment of the titanium surface with the sulfamic acid-fluoride ion solution results in etching of the surface and the formation of a film. This film is discernible to the naked eye, although its thickness may be so minute as not to be readily measurable. During treatment of the titanium surface a decided change in the appearance thereof takes place, due in large measure to the etching and to the formation of the film, and at the outset this change is not uniform over the surface. In time the changed appearance does become uniform, and this uniformity of appearance denotes substantial completion of the treatment. Contact of the solution with the titanium surface may continue beyond this point, although no significant advantage is obtained. As the film which forms builds up over the surface it serves as a barrier layer to reduce etching to a minimum so that the metal can be left in contact with the solution beyond the stated point. The exact time required to complete the treatment depends, as will be apparent from the foregoing, upon the acidity of the treating solution and upon the temperature of treatment. In view of these variables, it is impossible to set numerical time limits, and, at any rate, one becoming familiar with the process described herein will have no difficulty in determining for any set of conditions a suitable length of treating time. By suitable adjustment of the conditions the treating time can be as short as a few seconds. In many cases, however, such short treating times are not necessary or even desirable so that the conditions can be adjusted to operate in a matter of minutes. Preferably conditions are selected to insure completion of the treatment in less than about 20 minutes.

After treating the titanium surface with the sulfamic acid, the surface is dried, preferably after rinsing with water. The polymeric organic material may then be applied by any conventional means depending upon the exact nature of the polymeric organic material used. The polymeric organic material will generally be of the type that will form a film as is conventional in protective and/or decorative coatings and in adhesives. Such materials include natural and synthetic resins and rubbers, such as phenol-aldehyde resins; urea-aldehyde resins; furfural resins; epoxy resins; polyester resins; silicone resins; polyvinyl resins, like polyvinyl chloride, polyvinyl acetate, copolymers of vinyl chloride and vinyl acetate, polyvinylidene, and polyvinyl butyral; acrylic resins; polyurethane resins and rubbers; polyamide resins; isocyanate polymers and copolymers; polychloroprene; polybutadiene; neoprene Buna-S; butyl rubber; and the like. The treatment of the present invention produces the most marked results with compositions comprising natural or synthetic resins, and such materials constitute the preferred organic polymeric materials employed herein. The organic material may be applied as a solution or dispersion in a suitable liquid solvent or diluent, or as a pre-formed film.

Figure 2:
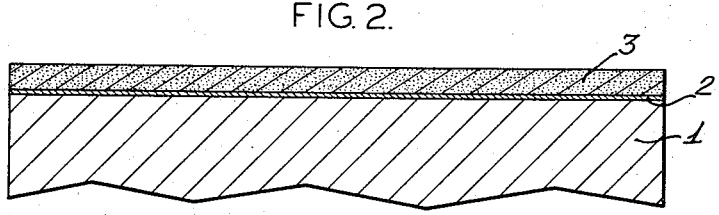
Figure 2 is a side view in section showing a coating adhered to the titanium by virtue of the film on the titanium surface.
Figure 3:
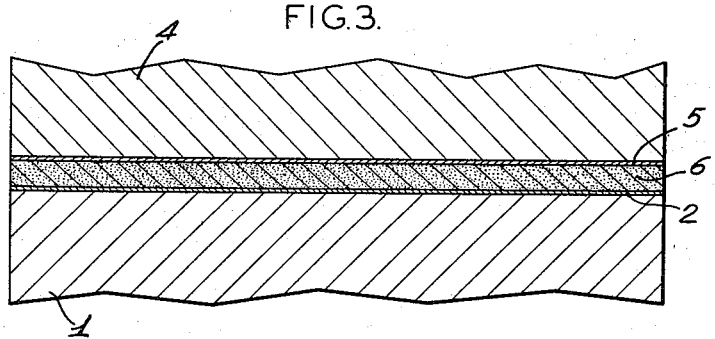
Figure 3 is a side view in section showing two treated pieces of titanium bonded to each other by means of an adhesive.

Referring to the drawings, Figure 1 illustrates a magnified cross-section of a body of titanium 1 the surface of which has been treated in accordance with the present invention to provide film 2 constituting a reaction product between the titanium of the titanium surface and sulfamic acid. Figure 2 illustrates the product of Figure 1 having thereon a layer 3, of organic polymeric material. Figure 3 illustrates the bonding of the assembly of Figure 1 to another solid body, in this illustration an assembly similar to that of Figure 1 and consisting of titanium 4 having thereon film 5. Treated titanium bodies 1 and 4 are bonded together by means of organic polymeric adhesive 6. Solid bodies which may be adhesively bonded to titanium as illustrated in Figure 3 may be any solid structural load-carrying material like metals, resins, rubbers, fabrics, wood, leather, glass, ceramics, and the like.

The present invention will be more readily understood from a consideration of the following examples which are given for the purpose of illustration only and are not intended to limit the scope of the invention in any way:

Example I

In this example four different baths are prepared bath (A) by dissolving 15 grams of sulfamic acid and .5 gram of sodium bifluoride in 160 ml. of water; bath (B) by dissolving 15 grams of sulfamic acid and 1.5 grams of sodium bifluoride in 160 ml. of water; bath (C) by dissolving 15 grams of sulfamic acid and 3 grams of sodium bifluoride in 160 ml. of water; and bath (D) by dissolving 15 grams of sulfamic acid in 160 ml. of water. Each bath has a pH of about 1. With each bath at 150° F., two commercially pure titanium strips are immersed in each bath for 12 minutes. The strips are then removed, rinsed in running water at room temperature and dried.

To one broad face of each of the strips is then applied a curing catalyst-containing epoxy resin prepared by mixing 12 parts of diethylenetriamine with 100 parts of epoxy resin. (The coated strips are allowed to stand open for about 75 minutes.) Each set of strips is then brought together with adhesive therebetween to provide a ½" lap joint. About 30 p.s.i. pressure is then applied, and the assemblies are held for about an hour at 300° F. The assemblies are then removed from the oven and press and allowed to cool to room temperature. The assemblies are then tested for shear strength on a Baldwin Tensile Tester.

The bonded titanium strips treated in bath (A) exhibit bond rupture at 2960 p.s.i.; the bonded titanium strips treated in bath (B) exhibit bond rupture at 3000 p.s.i.; the bonded titanium strips treated in bath (C) exhibit bond rupture at 2520 p.s.i.; and the bonded titanium strips treated in bath (D) exhibit bond rupture at 1010 p.s.i. Similar but untreated titanium strips of this type bonded with the same adhesive and in the same manner exhibit bond rupture at about 800–1500 p.s.i., depending upon the degree of cleanliness of the titanium strips.

Example II

In this example two baths are prepared as follows: (A) 16 grams of sulfamic acid in 160 ml. of water, and (B) 16 grams of sulfamic acid and 0.5 gram of sodium bifluoride in 160 ml. of water. With the baths at 180° F. and using immersion times of 5 and 15 minutes, respectively, for separate sets of strips of hot rolled annealed titanium, but otherwise using the procedure of Example I, the results are as follows:

| Bath | Time of immersion, minutes | Bond strength, p.s.i. |
| --- | --- | --- |
| A | 5 | 800 |
| A | 15 | 1,300 |
| B | 5 | 1,100 |
| B | 15 | 2,550 |

Considerable modification is possible in the selection of the particular technique and procedure employed without departing from the scope of the present invention.

I claim:

1. The method of treating a titanium surface which comprises treating said titanium surface with a solution of sulfamic acid containing fluoride ions at a pH below 3, said fluoride ions being present in an amount between 0.1 and 10%, by weight, based on the weight of the sulfamic acid, until the surface of said titanium is visibly altered through formation of a film thereon and recovering the titanium with said film on the surface thereof.

2. The method of bonding on organic polymeric material to a titanium surface which comprises treating said titanium surface with a solution of sulfamic acid containing fluoride ions at a pH below 3, said fluoride ions being present in an amount between 0.1% and 10%, by weight, based on the weight of the sulfamic acid, until the surface of said titanium is visibly altered through formation of a film thereon and recovering the titanium with said film on the surface thereof and thereafter applying the organic polymeric material to said treated titanium surface.

3. A treated titanium product comprising a titanium body having on a surface thereof a film comprising a reaction product between sulfamic acid and titanium of said titanium surface.

4. A composite structure comprising an organic polymeric material bonded to a titanium surface through the agency of a film formed on the surface of said titanium and comprising a reaction product of titanium of said titanium surface and sulfamic acid.

5. A composite structure comprising a solid body bonded to a titanium surface by means of an organic polymeric adhesive, there being between the adhesive and the titanium surface a film enhancing bonding between the adhesive and titanium surface comprising a reaction product between the titanium of said titanium surface and sulfamic acid.

6. A stable composition of matter in solid, finely-divided form, adapted for dissolution in a solvent to provide a bath for treating titanium surfaces, which comprises a mixture of dry, solid, finely-divided sulfamic acid and a dry, solid finely-divided fluoride in a weight ratio of between about 5 to 1 and about 100 to 1.

7. The composition of claim 6 wherein said fluoride is sodium bifluoride.

8. The composition of claim 7 wherein the weight ratio of sulfamic acid to sodium bifluoride is about 15 to 1.

References Cited in the file of this patent

UNITED STATES PATENTS

| | | |
|---|---|---|
| 1,888,457 | Gann et al. | Nov. 22, 1932 |
| 2,567,162 | Sanders | Sept. 4, 1951 |
| 2,629,676 | Prutton | Feb. 24, 1953 |
| 2,704,264 | Michel et al. | Mar. 15, 1955 |
| 2,711,364 | Beach | June 21, 1955 |

FOREIGN PATENTS

| | | |
|---|---|---|
| 693,776 | Great Britain | July 8, 1953 |

OTHER REFERENCES

Chemical Abstracts, vol. 49, 1955; page 15719b relied upon.